US010974592B2

(12) United States Patent
Jessie, Jr.

(10) Patent No.: US 10,974,592 B2
(45) Date of Patent: Apr. 13, 2021

(54) POWER MECHANISM FOR AUTOMATICALLY SWITCHING THE OPERATIONAL MODE OF A CHILD VEHICLE

(71) Applicant: Huffy Corporation, Miamisburg, OH (US)

(72) Inventor: Donald K. Jessie, Jr., Middletown, OH (US)

(73) Assignee: Huffy Corporation, Miamisburg, OH (US)

( * ) Notice: Subject to any disclaimer, the term of this patent is extended or adjusted under 35 U.S.C. 154(b) by 281 days.

(21) Appl. No.: 16/164,028

(22) Filed: Oct. 18, 2018

(65) Prior Publication Data

US 2019/0118647 A1    Apr. 25, 2019

Related U.S. Application Data

(60) Provisional application No. 62/575,817, filed on Oct. 23, 2017.

(51) Int. Cl.
*B62K 9/00* (2006.01)
*B60K 17/04* (2006.01)
(Continued)

(52) U.S. Cl.
CPC .......... *B60K 17/043* (2013.01); *B60K 7/0007* (2013.01); *B62K 3/002* (2013.01); *B62K 9/02* (2013.01); *B62K 23/02* (2013.01); *B62M 1/38* (2013.01); *B62M 6/60* (2013.01); *B62M 11/02* (2013.01); *B62M 23/00* (2013.01); *B60K 2007/0061* (2013.01); *B60L 2200/20* (2013.01);
(Continued)

(58) Field of Classification Search
CPC ............... B60K 17/043; B60K 7/0007; B60K 2007/0061; B62K 3/002; B62K 23/02; B62K 9/02; B62K 2204/00; B62K 2202/00; B62M 11/02; B62M 1/38; B62M 6/60; B62M 23/00; B60L 2200/20; B60Y 2200/126; B60Y 2200/81
See application file for complete search history.

(56) References Cited

U.S. PATENT DOCUMENTS 3,538,640 A    11/1970  Hayes et al.
3,889,773 A     6/1975  Chant
(Continued)

FOREIGN PATENT DOCUMENTS

CN    106545592 A    3/2017

*Primary Examiner* — Minnah L Seoh
*Assistant Examiner* — Marlon A Arce
(74) *Attorney, Agent, or Firm* — Wood Herron & Evans LLP (57) ABSTRACT

A child vehicle includes a power mechanism having a motor, at least one wheel selectively operatively coupled to the motor, and a propulsion switch coupled to the power mechanism and having a first position and a second position. The first position is from a user-initiated force. The propulsion switch automatically moves to the second position upon disengagement of the force. In the first position, the child vehicle is in the first operational mode and the wheel is being driven by the motor. In the second position, the child vehicle is in the second operational mode and the wheel is allowed to rotate substantially free from drag or resistance due to the motor. A method is also disclosed.

13 Claims, 8 Drawing Sheets

(51) Int. Cl.
  *B62M 6/60* (2010.01)
  *B62M 23/00* (2006.01)
  *B62K 9/02* (2006.01)
  *B60K 7/00* (2006.01)
  *B62K 3/00* (2006.01)
  *B62K 23/02* (2006.01)
  *B62M 11/02* (2006.01)
  *B62M 1/38* (2013.01)

(52) U.S. Cl.
  CPC ..... *B60Y 2200/126* (2013.01); *B60Y 2200/81* (2013.01); *B62K 2202/00* (2013.01); *B62K 2204/00* (2013.01)

(56) References Cited

U.S. PATENT DOCUMENTS

| | | | |
|---|---|---|---|
| 4,063,612 A * | 12/1977 | Weiss | B62B 5/0026 |
| | | | 180/19.2 |
| 4,399,883 A | 8/1983 | Todokoro | |
| 4,475,618 A | 10/1984 | Kennedy et al. | |
| 4,484,649 A | 11/1984 | Kennedy et al. | |
| 4,512,613 A | 4/1985 | Nassiri | |
| 4,540,380 A | 9/1985 | Kennedy et al. | |
| 4,560,022 A | 12/1985 | Kassai | |
| 4,573,943 A | 3/1986 | Kennedy et al. | |
| 4,643,695 A | 2/1987 | Kennedy et al. | |
| 4,773,495 A | 9/1988 | Haubenwallner | |
| 4,878,877 A * | 11/1989 | Auer | A63H 17/26 |
| | | | 446/463 |
| 5,135,063 A | 8/1992 | Kropf | |
| 5,237,302 A | 8/1993 | Harris | |
| 5,497,844 A | 3/1996 | Fritzinger | |
| 5,699,869 A | 12/1997 | Fritzinger et al. | |
| 5,859,509 A | 1/1999 | Bienz et al. | |
| 5,988,304 A | 11/1999 | Behrendts | |
| 6,206,751 B1 | 3/2001 | Lee | |
| 6,259,433 B1 * | 7/2001 | Meyers | G05G 9/047 |
| | | | 345/156 |
| 6,273,205 B1 | 8/2001 | Tsai | |
| 6,302,226 B1 | 10/2001 | Kanno et al. | |
| 6,343,667 B2 | 2/2002 | Sauve | |
| 6,364,736 B1 | 4/2002 | Lee | |
| 6,378,883 B1 * | 4/2002 | Epstein | A61G 5/04 |
| | | | 180/6.5 |
| 6,386,304 B1 | 5/2002 | Wang | |
| 6,394,213 B1 | 5/2002 | Tsai | |
| 6,464,029 B2 | 10/2002 | Gu | |
| 6,634,452 B2 | 10/2003 | Cheng et al. | |
| 6,874,587 B2 | 4/2005 | Wang | |
| 7,431,110 B2 * | 10/2008 | Greenwood | A61G 5/043 |
| | | | 180/65.1 |
| 7,673,715 B2 | 3/2010 | Takechi | |
| 8,141,668 B2 | 3/2012 | Huntsberger et al. | |
| 8,668,546 B2 | 3/2014 | Rudell et al. | |
| 9,120,657 B1 * | 9/2015 | Turner | B62B 1/10 |
| 9,474,985 B2 | 10/2016 | Huang | |
| 10,479,189 B2 * | 11/2019 | Jessie, Jr. | B60L 50/00 |
| 2002/0092692 A1 | 7/2002 | Chen | |
| 2002/0096380 A1 | 7/2002 | Lai | |
| 2004/0003952 A1 | 1/2004 | McGovern | |
| 2005/0067207 A1 | 3/2005 | Radtke et al. | |
| 2006/0266570 A1 | 11/2006 | Roth et al. | |
| 2009/0156094 A1 | 6/2009 | Seckel et al. | |
| 2013/0095971 A1 | 4/2013 | Hino et al. | |
| 2013/0263696 A1 | 10/2013 | Schneider | |
| 2016/0296848 A1 | 10/2016 | Taylor et al. | |
| 2018/0072381 A1 | 3/2018 | Guida | |
| 2018/0133075 A1 | 5/2018 | Jacobsson | |
| 2018/0134339 A1 | 5/2018 | Werner et al. | |
| 2018/0154771 A1 | 6/2018 | Orimo | |
| 2019/0389320 A1 * | 12/2019 | Stucki | B60L 53/16 |

* cited by examiner

POWER MECHANISM FOR AUTOMATICALLY SWITCHING THE OPERATIONAL MODE OF A CHILD VEHICLE

CROSS-REFERENCE TO RELATED APPLICATION

This application claims the benefit of and priority to U.S. Provisional Application No. 62/575,817 filed Oct. 23, 2017, the disclosure of which is incorporated by reference herein in its entirety.

TECHNICAL FIELD

The invention relates to a child vehicle, and more particularly to a child vehicle having a power mechanism that allows the vehicle to be driven by the motor in a first operational mode when a propulsion switch is engaged, and automatically disengaged from the motor in a second operational mode when the propulsion switch is not engaged, and thus free of motor drag or resistance.

BACKGROUND

Child vehicles, including a wide range of tricycles, quads, scooters and the like, remain very popular with consumers. Traditionally, these child vehicles were self-propelled, in that the rider of the vehicle typically provides the motive force that results in movement of the vehicle in a direction dictated by the handlebar or steering mechanism. These self-propelled vehicles might take the form of pedaled vehicles, such as traditional tricycles, or foot-powered vehicles, such as traditional scooters or foot-to-floor vehicles. More recently, however, consumers have found motorized vehicles an attractive alternative to self-propelled vehicles. These types of vehicles typically include an electric motor operatively coupled to one or more of the vehicle wheels for providing the motive force resulting in movement of the vehicle. Such motorized vehicles include a power source, such as a battery, for providing power to the electric motor. The battery is usually of a rechargeable type that allows the battery to be recharged over a certain period of time by coupling the battery to an electric outlet via a power cord or the like.

While motorized child vehicles have gained in popularity over the last several years, these vehicles have a number of drawbacks that limit their full acceptance in the commercial landscape. By way of example, the batteries used to power the electric motors are typically heavy and cumbersome to use. In this regard, a recharging operation may require the battery to be removed from the vehicle prior to charging. This may require the owner to perform several disassembly steps and lifting operations to achieve battery removal. Additionally, battery life for such motorized vehicles is often relatively short. For example, a typical battery may power a vehicle for as short as a few hours. Moreover, in contrast to useable battery life, the recharge time of these batteries is relatively long. For example, in many cases, the battery would need to be charged for several hours to reach a fully-charged state. Many users charge the battery overnight in anticipation of use the following day. In many cases, however, owners forget to charge the battery overnight which often results in frustration and disappointment.

Another drawback of motorized vehicles is that once the battery is depleted and the motor no longer propels the vehicle, children tend not to use the vehicle for further play and enjoyment. In this regard, the vehicle is often left abandoned in the yard, porch or garage until an adult recharges the battery. Accordingly, the available play time of the vehicle is limited, reducing the overall enjoyment factor of the vehicle. In an attempt to extend the play time of motorized vehicles, some vehicles are configured to be used in a traditional sense after the battery life has been depleted. However, the drive train of these vehicles, typically connected to one or more of the wheels, remains engaged with motor such that movement of the vehicle has to work against the motor (often associated with an audible motor "whining"). This results in a significant drag or resistance due to the motor that may make it difficult to move the vehicle under pedal power or foot power. Alternatively, some motorized vehicles are heavy, making carrying such vehicles difficult as well. Consequently, these vehicles remain difficult to use or move after the battery has been depleted, and as a result, are often not used after the battery is depleted.

Accordingly, there is a need for an improved motorized child vehicle that allows the vehicle to be more effectively used in a traditional sense after the battery life has been depleted.

SUMMARY

A child vehicle configured to operate in a first operational mode and a second operational mode is disclosed. The child vehicle includes a power mechanism having a motor, at least one wheel selectively operatively coupled to the motor for driving the child vehicle under the power of the motor, and a manually-actuated propulsion switch operatively coupled to the power mechanism and having a first position and a second position. The propulsion switch is configured to be in the first position as a result of engagement of an active force from a rider of the child vehicle on the propulsion switch. Additionally, the propulsion switch is configured to automatically move from the first position to the second position upon disengagement of the active force from the rider on the propulsion switch. When the propulsion switch is in the first position, the child vehicle is in the first operational mode and the wheel is being driven by the motor. When the propulsion switch is in the second position the child vehicle is in the second operational mode and the wheel is allowed to rotate substantially free from drag or resistance due to the motor.

In one embodiment, the power mechanism may further include an output gear operatively coupled to the motor, an engagement mechanism, and a starred drive wheel operatively coupled to the wheel of the child vehicle. The engagement mechanism is disposed between the output gear and the starred drive wheel and selectively operatively couples the output gear to the starred drive wheel. In one embodiment, the engagement mechanism may further include a mount coupled to the output gear, one or more magnetic members and a fixing piece. The mount may be formed from metal and interacts with the one or more magnetic members. The fixing piece may also be formed from metal. The starred drive wheel includes a plurality of grooves, wherein the one or more magnetic members engage the grooves in the starred drive wheel in the first operational mode and are disengaged from the grooves in the starred drive wheel when in the second operational mode.

In exemplary embodiment, the propulsion switch may include one of a button, lever, pedal or a rotating grip. Moreover, the propulsion switch may include a biasing member that automatically moves the propulsion switch from the first position to the second position. In one embodiment, the child vehicle is a scooter. In another embodiment, the child vehicle is a tricycle. In one embodiment, the propulsion switch may be mounted on a steering assembly of the child vehicle.

A method of operating a child vehicle having a propulsion switch, a first operational mode, and a second operational mode is disclosed. The method includes providing a power mechanism having a motor operatively coupled to a wheel of the child vehicle; operating the child vehicle in the first operational mode when the propulsion switch is actively engaged by a rider of the child vehicle, wherein in the first operational mode the child vehicle is being powered by the motor of the power mechanism; automatically transitioning from the first operational mode to the second operational mode when the propulsion switch is disengaged by the rider of the child vehicle; and operating the child vehicle in the second operational mode, wherein in the second operating mode the child vehicle is not being powered by the motor and the child vehicle may operate without substantially any drag or resistance from the motor.

In one embodiment, the power mechanism may include an output gear operatively coupled to the motor, an engagement mechanism, and a starred drive wheel operatively coupled to the wheel of the child vehicle. The method may then further include activating the engagement mechanism to operatively couple the output gear to the starred drive wheel and deactivating the engagement mechanism to operatively decouple the output gear from the starred drive wheel. In one embodiment, the engagement mechanism includes a mount coupled to the output gear and one or more magnetic members. The method may then further include moving the one or more magnetic members from a first position to a second position when the propulsion switch is engaged by the rider of the child vehicle, wherein in the second position the wheel of the child vehicle is operatively coupled to the motor of the power mechanism so that the wheel is driven by the motor, and moving the one or more magnetic members from the second position to the first position when the propulsion switch is disengaged by the rider of the child vehicle, wherein in the first position the wheel of the child vehicle is operatively decoupled from the motor of the power mechanism so that the wheel may rotate without substantially any drag or resistance from the motor.

In one embodiment, the power mechanism may further include a starred drive wheel, the starred drive wheel having a plurality of grooves. The method may then further include engaging the one or more magnetic members with the grooves of the starred drive wheel when in the first position and disengaging the one or more magnetic members from the grooves of the starred drive wheel when in the second position.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
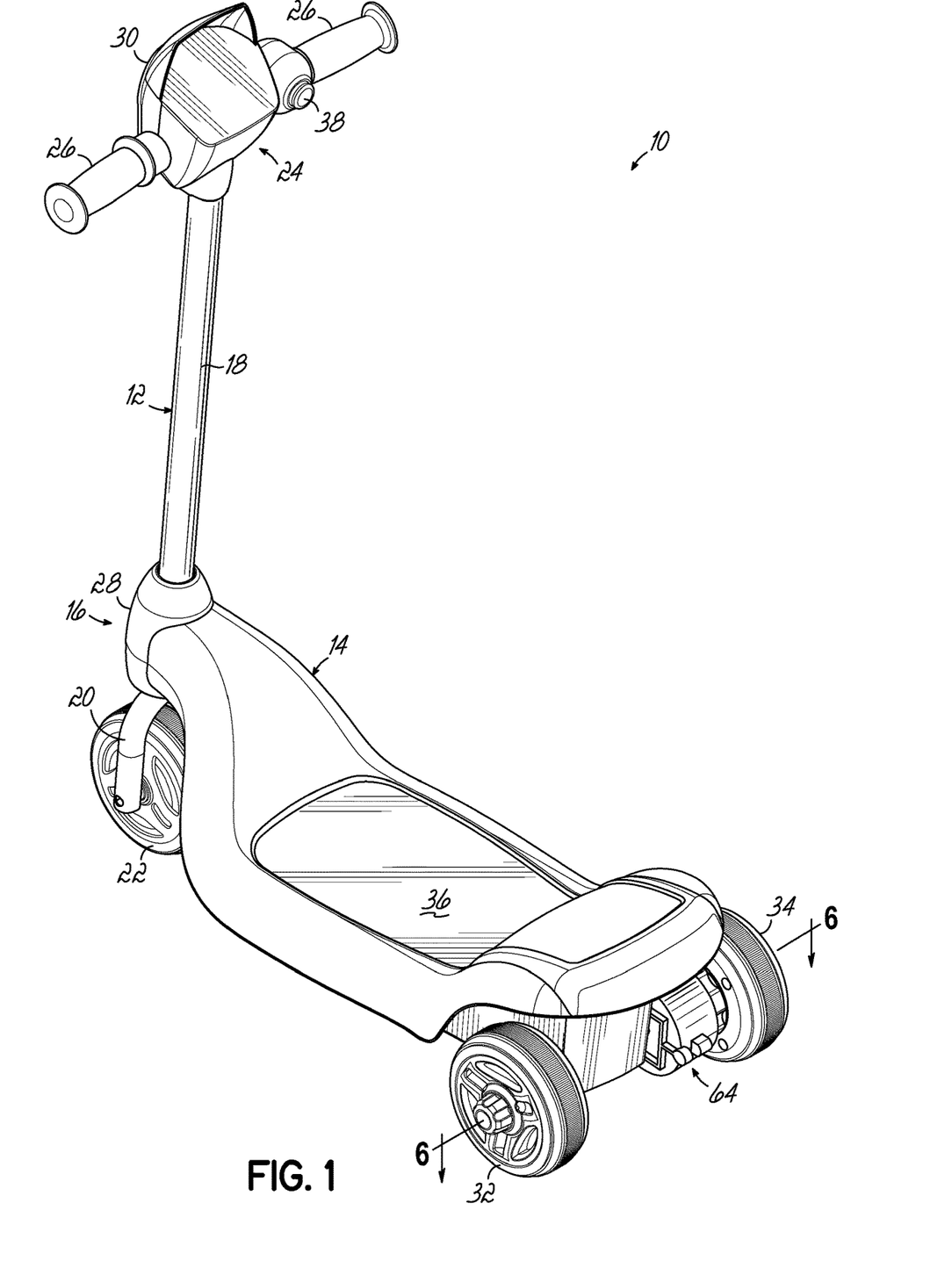
FIG. 1 is a perspective view of one embodiment of the invention configured as a scooter.
Figure 2:
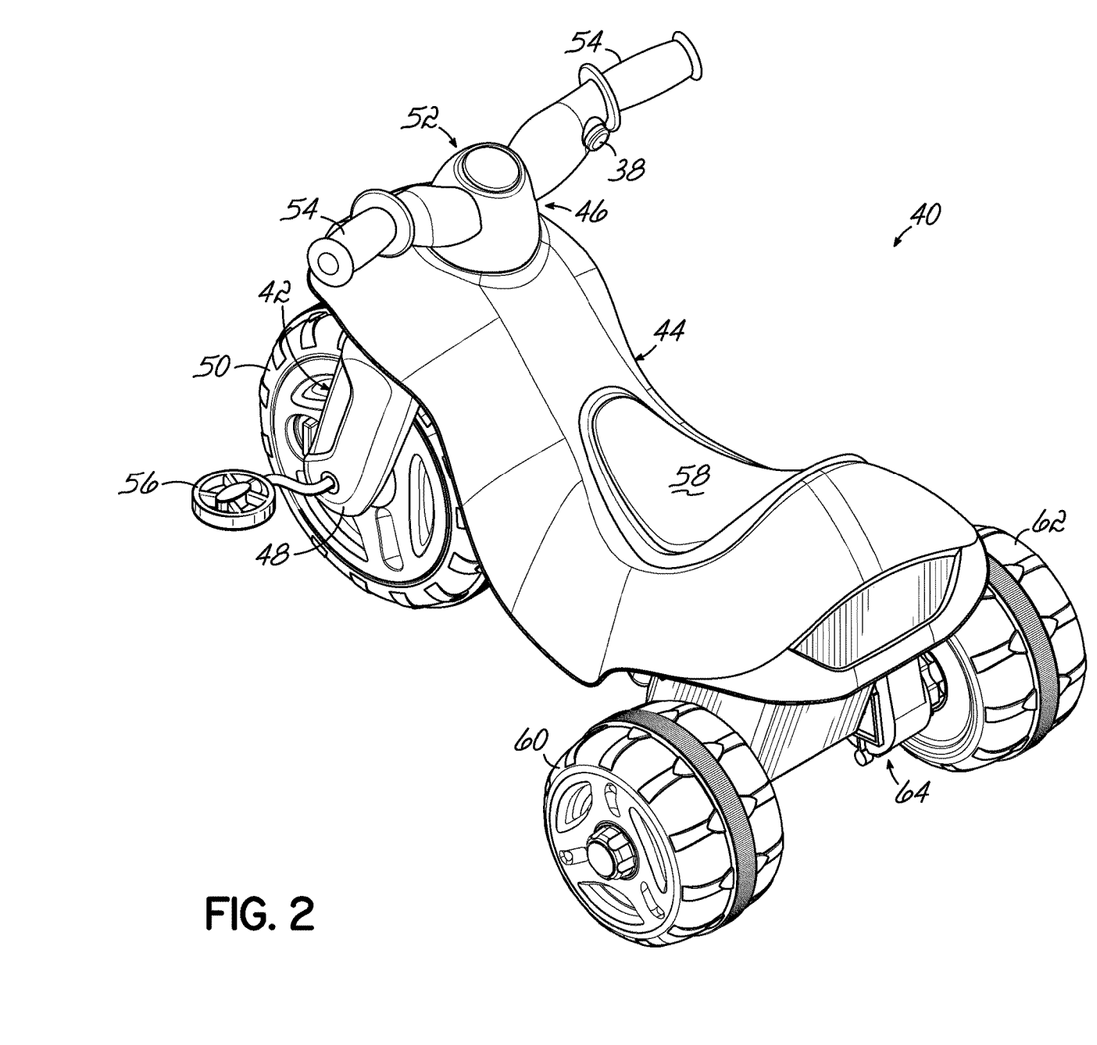
FIG. 2 is a perspective view of another embodiment of the invention configured as a tricycle.

Referring now to the drawings, FIGS. 1 and 2 illustrate exemplary embodiments of a child vehicle in accordance with aspects of the present invention. However, the invention is not so limited, as other possible child vehicle configurations are well understood in the art and commercially available, such as quads and other multi-wheeled vehicles. In this regard, FIG. 1 illustrates a motorized scooter 10 in accordance with an embodiment of the invention. The scooter 10 includes a first frame 12 operatively coupled to a second frame 14 at a joint 16. The joint 16 is configured such that the first frame 12 is rotatable relative to the second frame 14. The first frame 12 includes an elongate steering tube 18 having a fork 20 at one end thereof for receiving a front wheel 22 and a steering assembly 24 at the other end thereof. The steering assembly 24 may include grips 26 to be used by the rider for turning the front wheel 22, and thereby guiding the scooter 10 in a desired direction. The steering assembly 24 may further include a headpiece 30 that provides some desired function, such as sounds, lights, storage compartment, etc., or provides an ornamental aspect to the scooter 10.

The second frame 14 includes a head tube 28 configured to rotatably receive the steering tube 18, a deck 36 for supporting the rider, and a rear wheel 32 and a rear driven wheel 34. As noted above, the scooter 10 is configured as a motor-powered vehicle. Accordingly, the second frame 14 further includes a power mechanism 64 for providing a motive force for moving the scooter 10 in a direction dictated by the first frame 12, and the steering assembly 24 in particular. In an exemplary embodiment, the power mechanism 64 may include an electric motor 70. It is understood that the power mechanism 64 is operatively coupled to one or more of the rear wheels 32, 34 for driving the scooter 10. In an exemplary embodiment, the power mechanism 64 is operatively coupled to one driven wheel 34 leaving the additional rear wheel 32 free spinning. Although not shown, the power mechanism 64 may be coupled to a battery, such as a rechargeable battery, for providing power to the power mechanism 64.

In use, when the battery is charged and operational, a rider may selectively engage a propulsion switch 38 on the steering assembly 24 for providing power to the power mechanism 64 and causing the driven wheel 34 to turn and propel the scooter 10. In other words, the propulsion switch 38 causes the electrically powered vehicle to move forward while the propulsion switch 38 is engaged by the user. This motor driven state represents a first operational mode of the scooter 10. The propulsion switch 38 may take a wide variety of forms, including a lever, a button, a rotating grip, or other types of propulsion switches known in the art. The scooter 10 may be operated in this first operational mode until the battery is substantially depleted of power, at which point there is insufficient power to operate the power mechanism 64 and turn the driven wheel 34.

In accordance with an aspect of the invention, the scooter 10, and more particularly the driven wheel 34, is configured to be automatically disengaged from the power mechanism 64 and become free spinning, such that the scooter 10 may be operated in a traditional sense without being subjected to significant motor drag or resistance. In the instant embodiment, the scooter 10 is configured to be self-propelled by foot power in a second operational mode of the scooter 10 without being subjected to significant motor drag or resistance. In this regard, the power mechanism 64 of the scooter 10 automatically switches from the first operational mode (motor powered) to the second operational mode (foot powered) when power is off (i.e., when propulsion switch 38 is released by the rider). Accordingly, in the second operational mode, the driven wheel 34 is free to rotate independent of the power mechanism 64. In this regard, the scooter 10 may be used in a traditional sense, i.e., moved by the use of foot power and the driven wheel 34 may rotate independently of the power mechanism 64, and without significant motor drag or resistance.

As shown in FIG. 2, another embodiment of the present invention may include a motorized tricycle 40. The motorized tricycle 40 includes a first frame 42 operatively coupled to a second frame 44 at a joint 46. The joint 46 is configured such that the first frame 42 is rotatable relative to the second frame 44. The first frame 42 includes an elongate steering tube (not shown) having a fork 48 at one end thereof for receiving a front wheel 50 and a steering assembly 52 at the other end thereof. The steering assembly 52 may include grips 54 to be used by the rider for turning the front wheel 50, thereby guiding the tricycle 40 in a desired direction. The first frame 42 may further include a pair of pedals 56 (one shown) operatively coupled to the front wheel 50 such that rotation of the pedals 56 rotates the front wheel 50. The pedals 56 may be operatively coupled to the front wheel 50 in a direct drive arrangement, wherein rotation of the front wheel 50 causes a corresponding rotation of the pedals 56. Alternatively, the pedals 56 may be operatively coupled to the front wheel 50 through a free-wheel arrangement. In such an arrangement, the rotation of the front wheel 50 may not cause a corresponding rotation of the pedals 56. Such arrangements are known in the art and a further description of a free-wheel arrangement will not be provided.

The second frame 44 includes a head tube (not shown) configured to rotatably receive the steering tube of the first frame 42, a seat 58 for supporting the rider, and a rear wheel 60 and rear driven wheel 62. As noted above, the tricycle 40 is configured as a motor-powered vehicle. Accordingly, the second frame 44 further includes a power mechanism 64 for providing a motive force for moving the tricycle 40 in a direction dictated by the first frame 42, and the steering assembly 52 in particular. It is understood that the power mechanism 64 can be operatively coupled to one or more of the rear wheels 60, 62 for driving the tricycle 40 forward. In an exemplary embodiment, the power mechanism 64 is operatively coupled to one driven wheel 62 and the second rear wheel 60 is free spinning.

With continued reference to FIG. 2, in use, the battery is charged and operational, a rider may engage a propulsion switch 38 on the steering assembly 52 for providing power to the power mechanism 64 and causing the driven wheel 62 to turn and propel the tricycle 40 along a ground surface. This motor driven state represents a first operational mode of the tricycle 40. The propulsion switch 38 may take a wide variety of forms, including a lever, a button, a rotating grip, pedal or other types of propulsion switches known in the art. For example, the propulsion switch may be hand or foot activated. The tricycle 40 may be operated in this first operational mode until the battery is substantially depleted of power, at which point there is insufficient power to operate the power mechanism 64 and turn the driven wheel 62. When the rider releases the propulsion switch 38, the power mechanism 64 automatically disengages from the driven wheel 62 allowing the tricycle 40 to be operated without the battery. The power mechanism 64 does not require separate manual activation of a switch, lever, or button. Instead, the power mechanism 64 automatically disengages from the driven wheel 62 when the propulsion switch 38 is disengaged by the rider, and the driven wheel 62 becomes free spinning.

In accordance with an aspect of the invention, the tricycle 40, and more particularly the driven wheel 62, is configured to be automatically disengaged from the power mechanism 64 such that the tricycle 40 may be operated in a traditional sense (e.g., foot powered) without being subjected to significant motor drag or resistance. This improves the smoothness of the ride for a rider, allows the rider to easily pedal the tricycle 40, and also allows the tricycle 40 to coast for an extended period of time.

In this regard, when it is desired to move the scooter 10 or tricycle 40 from its first operational mode to its second operational mode, such as when the propulsion switch 38 is no longer manually activated (for example, when the propulsion switch 38 is released by the rider), the power mechanism 64 automatically disengages so that the scooter 10 or tricycle 40 may operate in a traditional sense (non-powered) and without significant drag or resistance from the power mechanism 64. Moreover, since the power mechanism 64 automatically disengages when the propulsion switch 38 is no longer engaged, there are no additional steps or procedures required by the rider to operate the scooter 10 or tricycle 40 manually (without power). In an exemplary embodiment, this may be achieved by having a propulsion switch 38 that requires the rider to provide an active force to the switch 38 in order to be in the first operational mode (powered mode) but moves to the second operational mode (non-powered mode) automatically upon the release of the active force on the propulsion switch 38. Such an automatic transition between operational modes is advantageous, because the scooter 10 or tricycle 40 may be at a location remote from a power station, such that the rider could still enjoy the scooter 10 or tricycle 40 without intervention by another person (such as an adult) to manually switch a vehicle between the first and second operational modes or move the vehicle to an appropriate location for charging.

Figure 3:
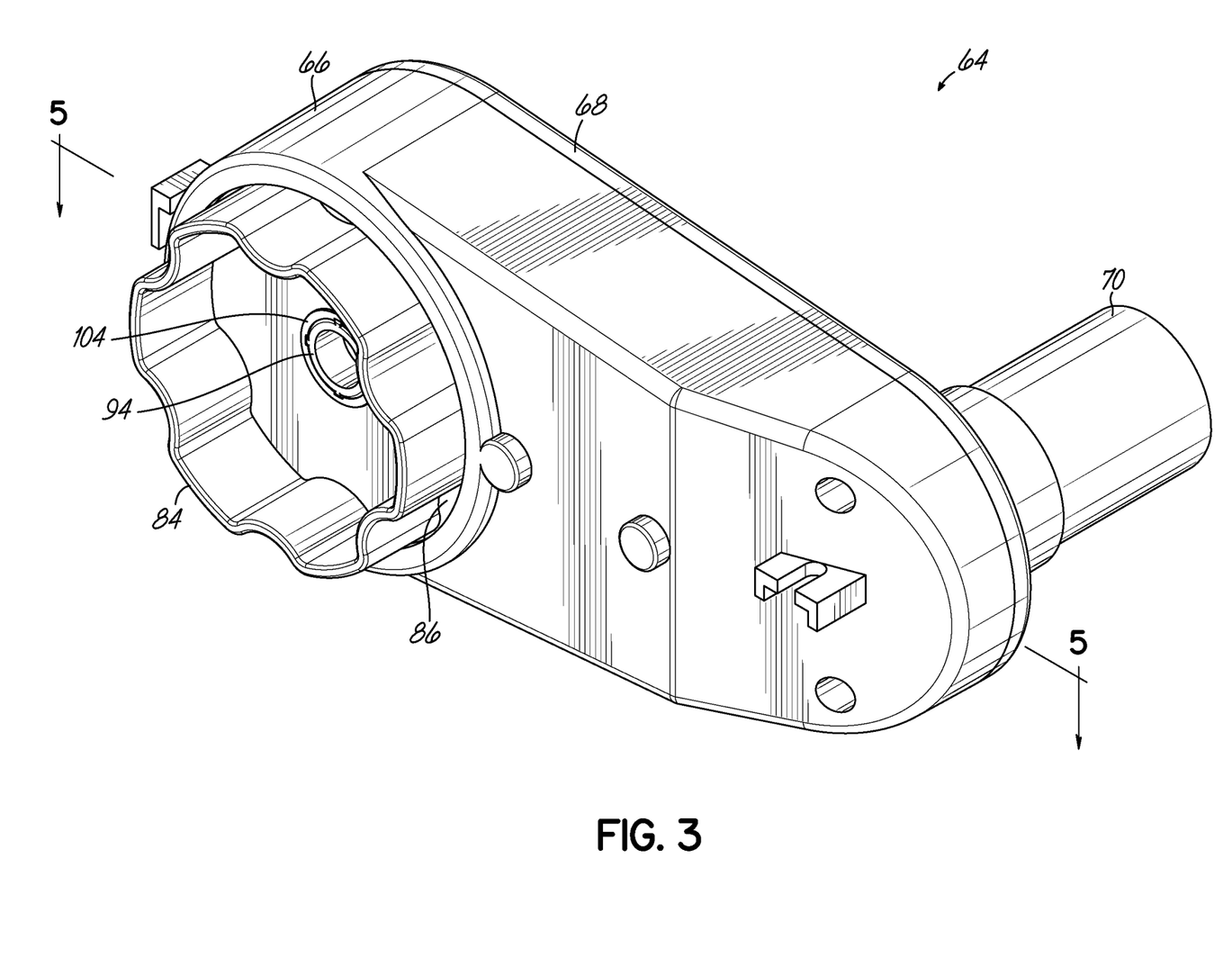
FIG. 3 is a perspective view of a power mechanism in accordance with the invention.

The power mechanism 64 for both the scooter 10 and the tricycle 40 may be substantially the same. Accordingly, the details of the power mechanism 64 will be described in regard to the scooter 10 configuration. It should be recognized, however, that the details of the power mechanism 64 also apply to the tricycle 40. FIG. 3 illustrates the power mechanism 64 for the scooter 10 and FIG. 4 illustrates a disassembled view of the power mechanism 64.

Referring now to FIGS. 3-8, the power mechanism 64 includes a first housing 66, a second housing 68, a motor 70, a driver gear 72 secured to a drive shaft 88 and directly driven by the motor 70, a transmission driven gear 74 including a transmission driver gear 76, a secondary transmission driven gear 78 including a secondary transmission driver gear 80, an output gear 82, and a starred drive wheel 84. The starred drive wheel 84 selectively couples to the driven wheel 34 of the scooter, as described in further detail below, and provides the motive force to move the scooter 10 in the motor powered operational mode. The driver gear 72, transmission driven and driver gears 74, 76, the secondary transmission driven and driver gears 78, 80, and the output gear 82 are housed within the first and second housings 66, 68 of the power mechanism 64. The starred drive wheel 84 communicates with the output gear 82 through an aperture 86 in the first housing 66 wherein a portion of the starred drive wheel 84 remains outside of the first housing 66 to couple with the driven wheel 34 of the scooter 10. The starred drive wheel 84 is rotatably supported by a drive axle 94 that is integrally formed as part of the second housing 68.

In a preferred embodiment, the motor 70 may be an electric motor, but the invention is not so limited, as other types of motors may also be used. As electric motors and other possible motors are well understood in the art and commercially available, the details of the motor 70 will not be further described herein. Although not shown, the motor 70 may be coupled to a battery, such as a rechargeable battery, for providing power to the motor 70.

Figure 4:
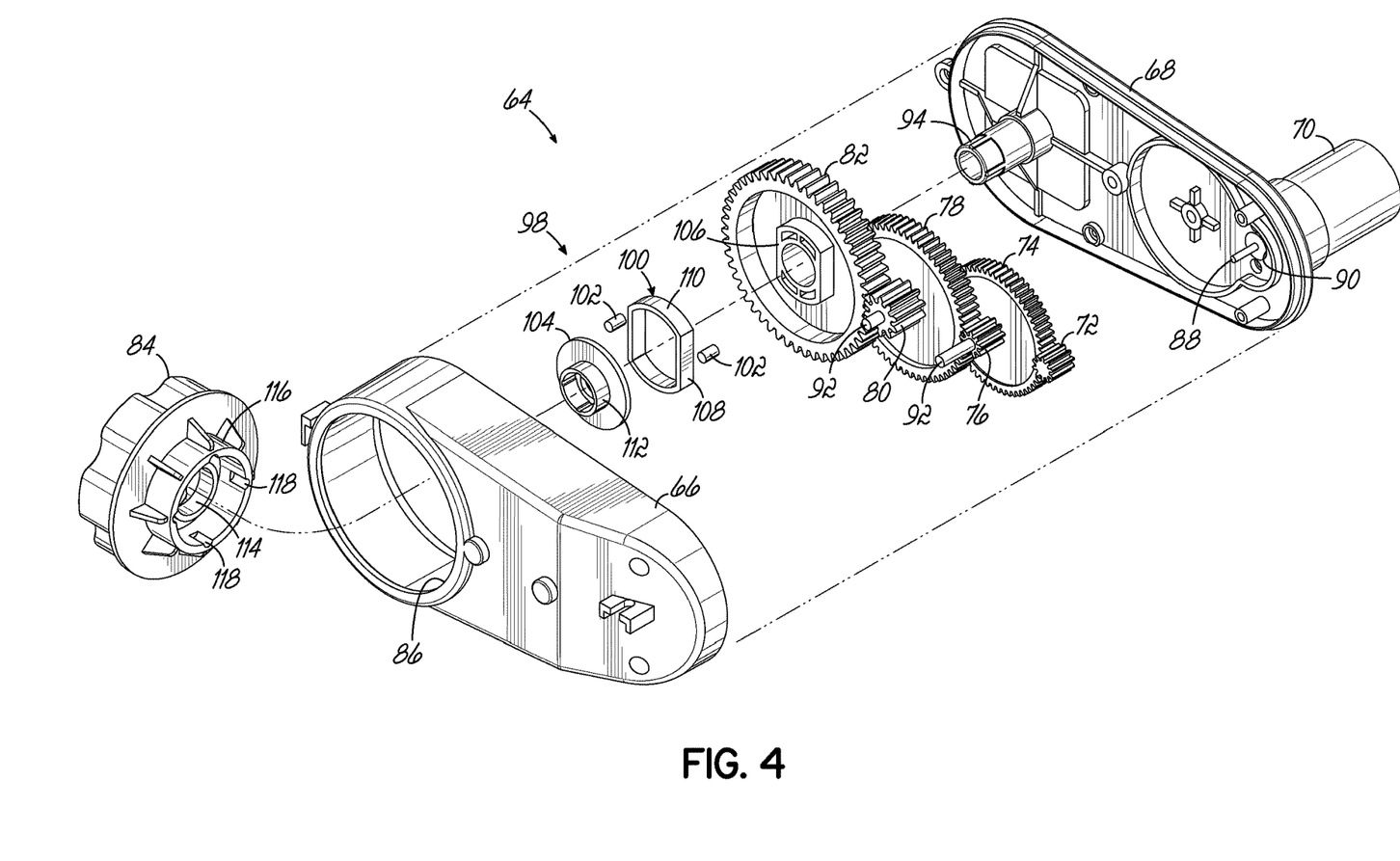
FIG. 4 is a disassembled perspective view of the power mechanism of FIG. 3.
Figure 5:
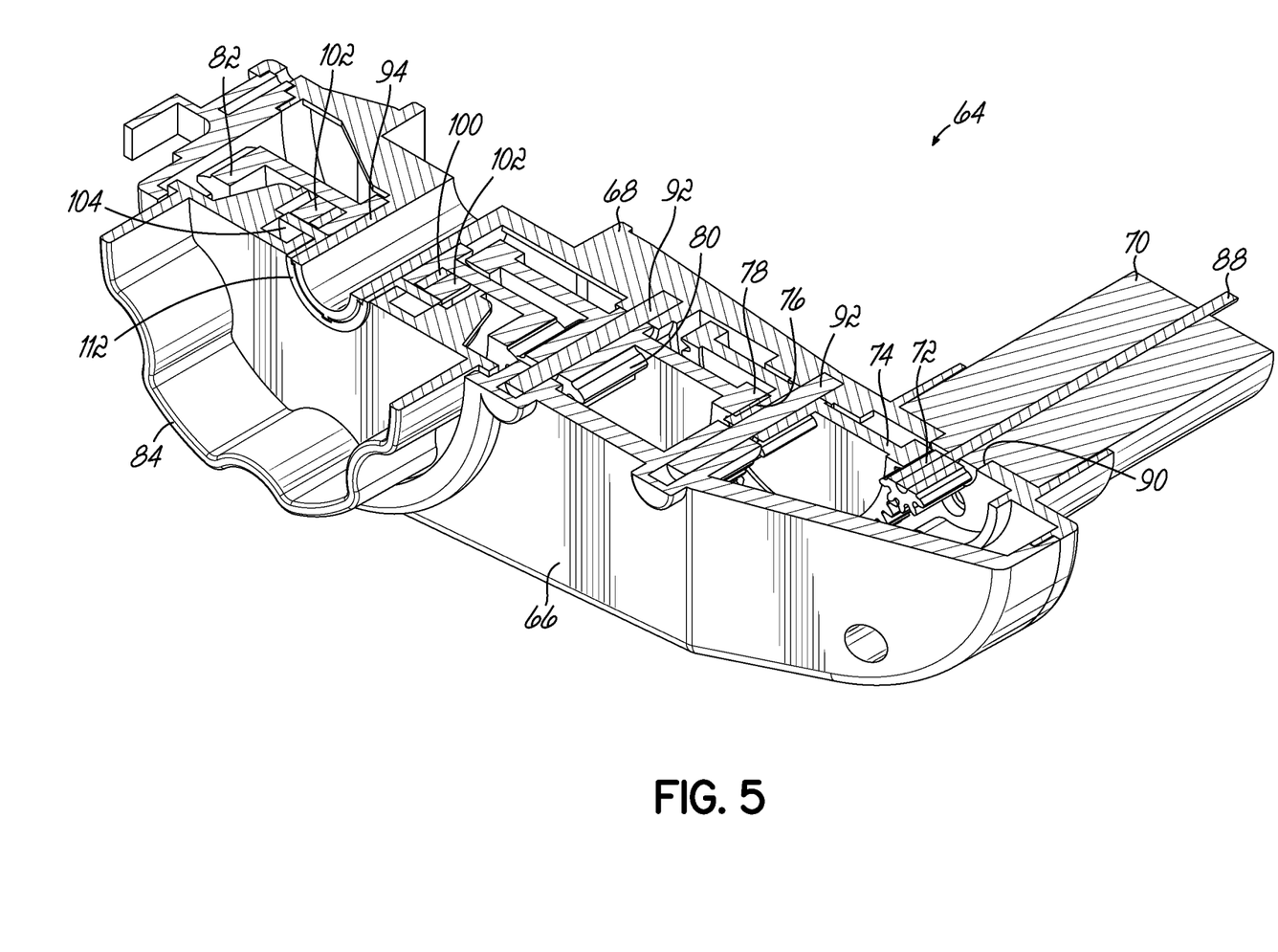
FIG. 5 is a cross-sectional view of the power mechanism of FIG. 3 taken across line 5-5.

Referring now to FIG. 4, the motor 70 is secured to the second housing 68 and the motor 70 drive shaft 88 communicates with the driver gear 72 through an aperture 90 in the second housing 68. The driver gear 72 is secured to the drive shaft 88 and directly driven by the motor 70. The driver gear 72 is engaged with the transmission driven gear 74 which further includes the transmission driver gear 76 such that both are rotatably secured between the first housing 66 and second housing 68 with an axle 92. The transmission driver gear 76 is coupled to the transmission driven gear 74 such that the two do not move independently of each other. The transmission driver gear 76 is engaged with the secondary transmission driven gear 78 which further includes the secondary transmission driver gear 80 which are also rotatably secured between the first housing 66 and the second housing 68 with an axle 92. The secondary transmission driver gear 80 is coupled to the transmission driven gear 78 such that the two do not move independently of each other. The secondary transmission driver gear 80 is engaged to the output gear 82. The output gear 82 is rotatably secured between the first housing 66 and the second housing 68 by the drive axle 94. As a result of the engagements described above, the rotational or motive force provided by the motor 70 is transferred to the output gear 82 and to the starred drive wheel 84 which is selectively coupled to the output gear 82 as described in further detail below.

The output gear 82 and the starred drive wheel 84 are selectively coupled together through the use of an engagement mechanism 98 which is activated/deactivated using the propulsion switch 38. In an exemplary embodiment, the engagement mechanism 98 includes a mount 100, a pair of magnetic rods or cylinders 102, and a fixing piece 104. The mount 100 may be made of metal and is configured to be mounted to a raised hub 106 on a side of the output gear 82 that faces the first housing 66 so that the mount 100 rotates with rotation of the output gear 82. The mount 100 includes a pair of generally straight sidewalls 108 and a pair or arcuate walls 110, and the raised hub 106 has a similar shape so as to receive the mount 100 thereon in a complementary fit. The magnetic cylinders 102 are configured to be adjacent the sidewalls 108 and move there along, as explain in more detail below.

The fixing piece 104 may also be formed of metal and be generally circular in shape. The fixing piece 104 may be mounted on the end of the drive axle 94 and locked against rotations relative to the drive axle 94 (i.e., the fixing piece does not rotate). For example, the drive axle 94 may include one or more ridges received in one or more corresponding grooves in the fixing piece 104. A shaft portion 112 of the fixing piece 104 is configured to be received in an inner hub 114 of the rotatable starred drive wheel 84 such that the shaft portion 112 of the fixing piece 104 is the surface that interacts with the starred drive wheel 84. Because the fixing piece 96 is typically made of a metal material, this configuration limits wear and stress loads experienced by the starred drive wheel 84 which is typically made of a plastic material. In order to facilitate coupling and decoupling of the output gear 82 and the starred drive wheel 84 during operation, as described in further detail below, the drive axle 94 is configured to allow a small amount of lateral movement of the starred drive wheel 84 along the axis of the drive axle 94.

Figure 6A:
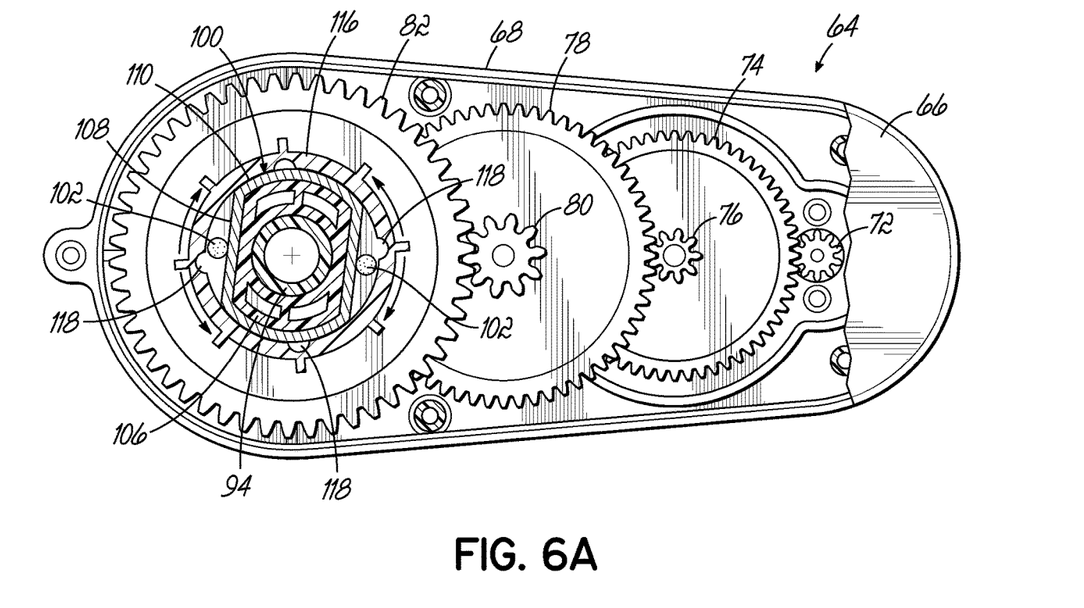
FIGS. 6A-6E illustrate the operation of the power mechanism in first and second operational modes.

Operation of the power mechanism 64, and more particularly the operation of the engagement mechanism 98, to transition between the first and second operational modes will be explained in reference to FIGS. 6A-6E. FIG. 6A illustrates the power mechanism 64 in the second non-powered operational mode. In this operational mode, the propulsion switch 38 is not engaged by the rider and there is no power being supplied to the motor 70 that would turn the output gear 82. Accordingly, the output gear 82 and mount 100 do not rotate about their central axes. The magnetic cylinders 102 are generally positioned along a central portion of the straight sidewalls 108 of the mount 100. As can be seen from FIG. 6A, aspects of the engagement mechanism 98 are positioned within an outer hub 116 of the starred drive wheel 84 (also see FIG. 4). Accordingly, the starred drive wheel 84 is decoupled from the motor 70 and is free to rotate substantially free from any drag or resistance from the motor 70.

Figure 6B:
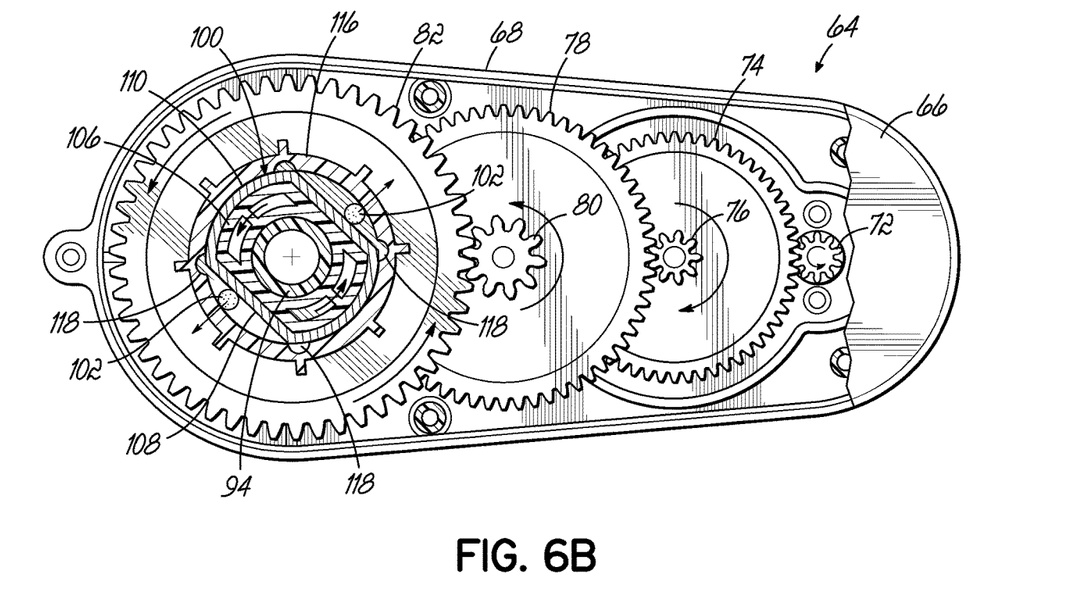
Figure 6C:
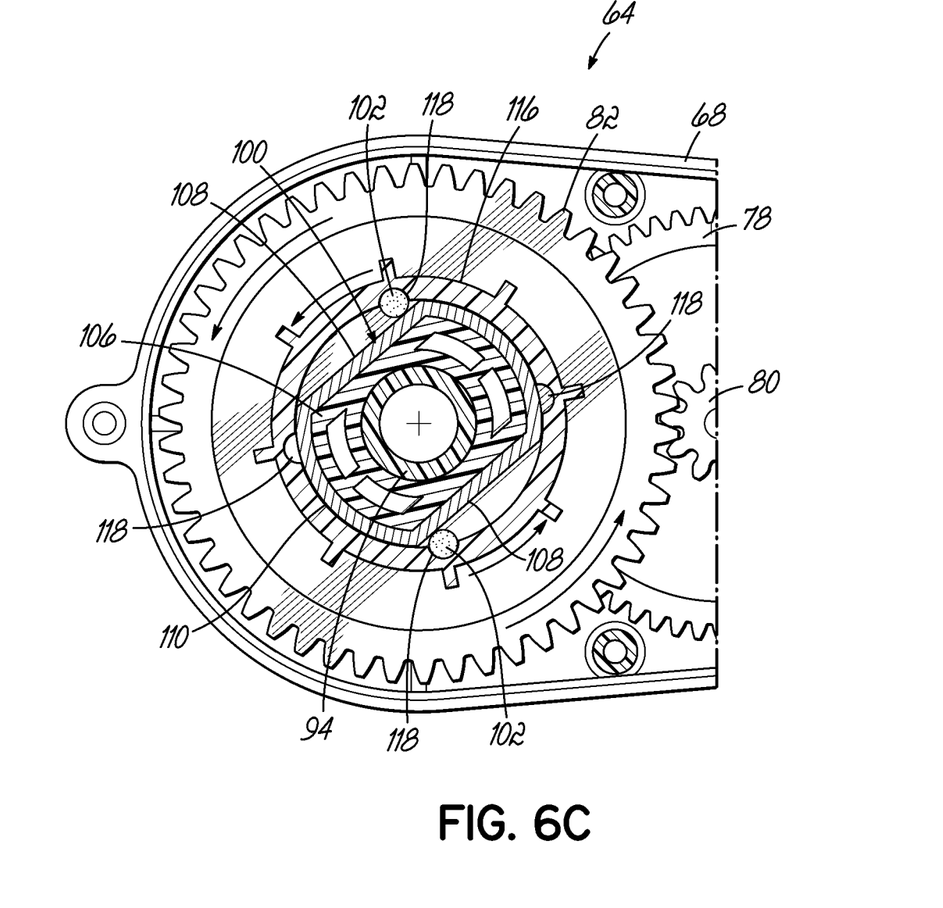

As illustrated in FIGS. 6B and 6C, when the rider engages the propulsion switch 38, power is fed to the motor 70 and the output gear 82 starts to rotate in a certain rotational direction (e.g., forward direction of the scooter 10). Of course, the rotation of the output gear 82 also rotates the raised hub 106 and the mount 100 positioned thereon. With the rotation of the mount 100, the magnetic cylinders 102 move along the sidewalls 108 of the mount 100 due to inertial effects so as to be positioned adjacent opposed corners of the sidewalls 108 (see FIG. 6C). As the rotation of the output gear 82 and mount 100 continue, the magnetic cylinders 102 drop into grooves 118 on the inner surface of the outer hub 116 of the starred drive wheel 84. This is best illustrated in FIG. 6C. When the magnetic cylinders 102 drop into the grooves 116, further rotation of the output gear 82 from the motor 70 causes a corresponding rotation in the starred drive wheel 84 and thus the driven wheel 34 to which the drive wheel 84 is operably coupled. This represents the power-driven mode of the scooter 10 (or tricycle 40) with the motor 70 of the power mechanism 64 powering the motion of the scooter 10.

In one aspect according to the invention, the propulsion switch 38 is not a static switch having simply an off/on position such as on the base or underside of the second frame 14 of the scooter 10. Instead, the propulsion switch 38 is a dynamic switch meant to be engaged and disengaged during, for example, powered use of the scooter 10. Thus, the propulsion switch 38 is positioned so as to be readily accessible to the rider of the scooter 10 (see FIGS. 1 and 2). When the rider disengages the propulsion switch 38, such as by releasing a button, lever, pedal, etc., the propulsion switch 38 automatically moves to a position that cuts power to the motor 70. For example, the propulsion switch 38 may include a spring or other biasing mechanism (not shown) that moves the switch to a non-powered motor position upon disengagement of the switch 38 by the rider. Unlike static switches, the propulsion switch 38 is configured such that the power mechanism 64 transitions the scooter 10 to a non-powered or free-wheel operating mode upon the rider's disengagement of the propulsion switch 38.

Figure 6D:
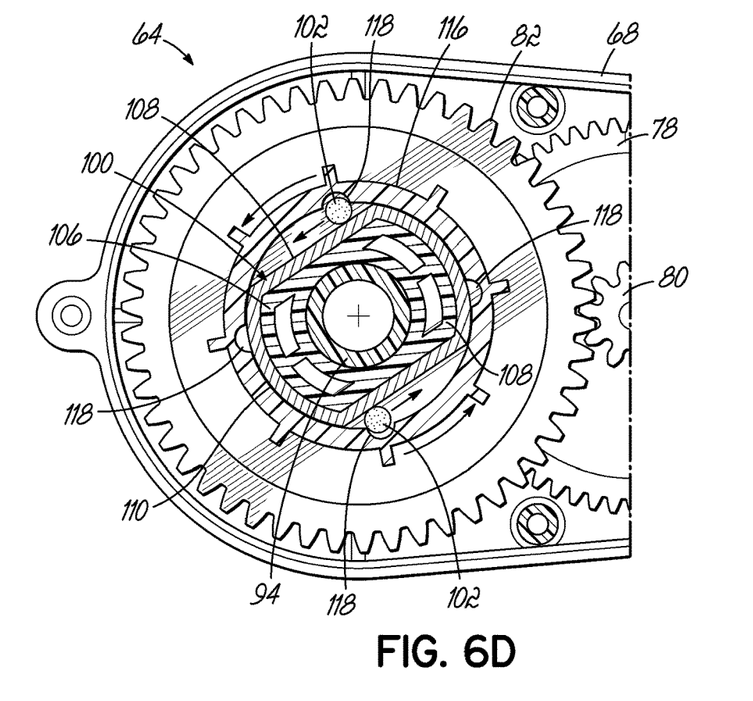
Figure 6E:
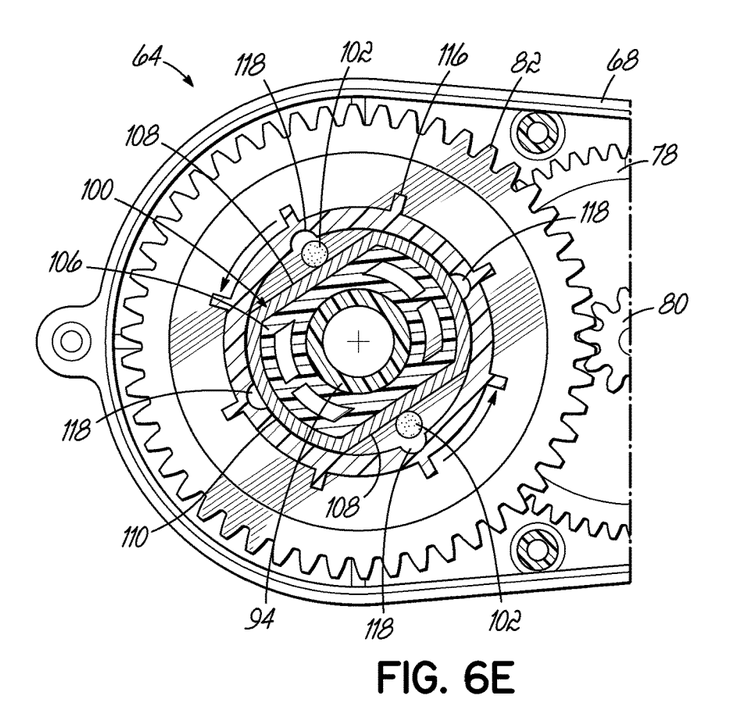

This transition is illustrated in FIGS. 6D and 6E. More particularly, upon release of the propulsion switch 38, power to the motor 70 of the power mechanism 64 is cut off and the output gear 82, as well as the mount 100, no longer rotate about its axis. However, the driven wheel 34, and thus the starred drive wheel 84 and outer hub 116 thereof, may either continue to rotate or start rotating with further movement of the scooter 10. As shown in FIG. 6D, this causes the magnetic cylinders 102 to move away from the opposed corners of the mount 100 and back toward a central region of the sidewalls 108 under the rotation of the outer hub 116 relative to the stationary output gear 82 and mount 100. With continued movement of the magnetic cylinders 102 along the sidewalls 108 of the mount 100, the outer hub 116 of the starred drive wheel 84 will disengage the magnetic cylinders 102 such that there is no further movement of the cylinders 102 along the sidewalls 108 of the mount. At this point, the starred drive wheel 84, and thus the driven wheel 34, is no longer operatively coupled to the output gear 82 or motor 70 of the power mechanism. Thus, the scooter 10 may be used in a traditional (foot powered) sense free from substantially any drag or resistance on the scooter's movement due to the motor 70 or other components of the power mechanism 64.

The operational coupling and decoupling of the output gear 82 and the starred drive wheel 84 allows for transition between the first and second operational modes as previously discussed. When the motor 70 is engaged through the use of the propulsion switch 38, the magnetic cylinders 102 are positioned relative to the mount 100 in an active position such that the cylinders 102 engage grooves 118 in the outer hub 116 of the starred drive wheel 84 and the starred drive wheel 84 is directly driven by the motor 70 (via output gear 82). This engagement defines the first operational mode, providing a propulsion force for the scooter 10 by rotating the driven wheel 34. When the propulsion switch 38 is released or disengaged, the magnetic cylinders 102 move to a passive position relative to the mount 100 such that they no longer engage with the grooves 118 in the outer hub 116 of the starred drive wheel 84. This defines the decoupled and second operational mode where the starred drive wheel 84 turns independently of the output gear 82 and motor 70. Thus, the scooter 10 may be used without any substantial drag or resistance from the power mechanism 68, including the motor 70.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A child vehicle configured to operate in a first operational mode and a second operational mode, comprising:
   a power mechanism comprising a motor, an output gear operatively coupled to the motor, an engagement mechanism, and a drive wheel, wherein the engagement mechanism is disposed between the output gear and the drive wheel and selectively operably couples the output gear to the drive wheel;
   at least one wheel coupled to the drive wheel for driving the child vehicle under the power of the motor; and
   a manually-actuated propulsion switch operatively coupled to the power mechanism and having a first position and a second position, the propulsion switch configured to be in the first position as a result of engagement of an active force from a rider of the child vehicle on the propulsion switch, and the propulsion switch configured to automatically move from the first position to the second position upon disengagement of the active force from the rider on the propulsion switch,
   wherein when the propulsion switch is in the first position the child vehicle is in the first operational mode and the wheel is being driven by the motor, and when the propulsion switch is in the second position the child vehicle is in the second operational mode and the wheel is allowed to rotate substantially free from drag or resistance due to the motor, and
   wherein the engagement mechanism comprises a mount coupled to the output pear and one or more magnetic members, wherein the drive wheel includes a plurality of grooves, and wherein the one or more magnetic members engage the grooves in the drive wheel when in the first operational mode and are disengaged from the grooves in the drive wheel when in the second operational mode.

2. The child vehicle of claim 1, wherein the engagement mechanism further comprises a fixing piece.

3. The child vehicle of claim 1, wherein the mount is formed from metal and interacts with the one or more magnetic members.

4. The child vehicle of claim 2, wherein the fixing piece is formed from metal.

5. The child vehicle of claim 1, wherein the propulsion switch includes one of a button, lever, pedal or a rotating grip.

6. The child vehicle of claim 1, wherein the propulsion switch includes a biasing member that automatically moves the propulsion switch from the first position to the second position.

7. The child vehicle of claim 1, wherein the child vehicle is a scooter.

8. The child vehicle of claim 1, wherein the child vehicle is a tricycle.

9. The child vehicle of claim 1, wherein the propulsion switch is mounted on a steering assembly of the child vehicle.

10. A method of operating a child vehicle, comprising:
    providing the child vehicle of claim 1;
    operating the child vehicle in the first operational mode when the propulsion switch is actively engaged by a rider of the child vehicle, wherein in the first operational mode the child vehicle is being powered by the motor of the power mechanism;
    automatically transitioning from the first operational mode to the second operational mode when the propulsion switch is disengaged by the rider of the child vehicle; and
    operating the child vehicle in the second operational mode, wherein in the second operating mode the child vehicle is not being powered by the motor and the child vehicle may operate without substantially any drag or resistance from the motor.

11. The method of claim 10, further comprising:
    activating the engagement mechanism to operatively couple the output gear to the drive wheel; and
    deactivating the engagement mechanism to operatively decouple the output gear from the drive wheel.

12. The method of claim 11, further comprising:
    moving the one or more magnetic members from a first position to a second position when the propulsion switch is engaged by the rider of the child vehicle, wherein in the second position the wheel of the child vehicle is operatively coupled to the motor of the power mechanism so that the wheel is driven by the motor; and moving the one or more magnetic members from the second position to the first position when the propulsion switch is disengaged by the rider of the child vehicle, wherein in the first position the wheel of the child vehicle is operatively decoupled from the motor of the power mechanism so that the wheel may rotate without substantially any drag or resistance from the motor.

13. The method of claim 12, further comprising:

engaging the one or more magnetic members with the grooves of the drive wheel when in the first position; and disengaging the one or more magnetic members from the grooves of the drive wheel when in the second position.

* * * * *